United States Patent
Liu et al.

(10) Patent No.: US 11,810,377 B2
(45) Date of Patent: Nov. 7, 2023

(54) POINT CLOUD SEGMENTATION METHOD, COMPUTER-READABLE STORAGE MEDIUM, AND COMPUTER DEVICE

(71) Applicant: TENCENT TECHNOLOGY (SHENZHEN) COMPANY LIMITED, Shenzhen (CN)

(72) Inventors: Shu Liu, Shenzhen (CN); Xinlong Wang, Shenzhen (CN); Xiaoyong Shen, Shenzhen (CN); Jiaya Jia, Shenzhen (CN); Yuwing Tai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 84 days.

(21) Appl. No.: 17/383,406

(22) Filed: Jul. 22, 2021

(65) Prior Publication Data

US 2021/0350183 A1 Nov. 11, 2021

Related U.S. Application Data

(63) Continuation of application No. PCT/CN2020/074637, filed on Feb. 10, 2020.

(30) Foreign Application Priority Data

Feb. 25, 2019 (CN) .......................... 201910138419.6

(51) Int. Cl.
*G06V 20/64* (2022.01)
*G06T 9/00* (2006.01)
(Continued)

(52) U.S. Cl.
CPC ............ *G06V 20/64* (2022.01); *G06F 18/211* (2023.01); *G06F 18/2163* (2023.01);
(Continued)

(58) Field of Classification Search
CPC .. G06K 9/6261; G06K 9/6215; G06K 9/6218; G06K 9/6228; G06K 9/6289;
(Continued)

(56) References Cited

U.S. PATENT DOCUMENTS

| 10,176,388 B1 | 1/2019 | Ghafarianzadeh et al. |
| 2018/0108137 A1 | 4/2018 | Price et al. |

(Continued)

FOREIGN PATENT DOCUMENTS

| CN | 105006016 A | 10/2015 |
| CN | 106709481 A | 5/2017 |

(Continued)

OTHER PUBLICATIONS

SGPN Similarity Group Proposal Network, Wang et al, 2018 (Year: 2018).*

(Continued)

*Primary Examiner* — Jianxun Yang
(74) *Attorney, Agent, or Firm* — ANOVA LAW GROUP, PLLC

(57) ABSTRACT

This application relates to a point cloud segmentation method, a computer-readable storage medium, and a computer device. The method includes encoding a to-be-processed point cloud to obtain a shared feature, the shared feature referring to a feature shared at a semantic level and at an instance level; decoding the shared feature to obtain a semantic feature and an instance feature respectively; adapting the semantic feature to an instance feature space and fusing the semantic feature with the instance feature, to obtain a semantic-fused instance feature of the point cloud, the semantic-fused instance feature representing an instance feature fused with the semantic feature; dividing the semantic-fused instance feature of the point cloud, to obtain a semantic-fused instance feature of each point in the point (Continued)

cloud; and determining an instance category to which each point belongs according to the semantic-fused instance feature of each point.

18 Claims, 6 Drawing Sheets

(51) Int. Cl.
  *G06F 18/21* (2023.01)
  *G06F 18/22* (2023.01)
  *G06F 18/23* (2023.01)
  *G06F 18/211* (2023.01)
  *G06F 18/25* (2023.01)
  *G06V 10/80* (2022.01)
  *G06V 10/82* (2022.01)
  *G06V 10/26* (2022.01)
  *G06V 20/70* (2022.01)

(52) U.S. Cl.
  CPC .............. *G06F 18/22* (2023.01); *G06F 18/23* (2023.01); *G06F 18/251* (2023.01); *G06T 9/001* (2013.01); *G06V 10/26* (2022.01); *G06V 10/806* (2022.01); *G06V 10/82* (2022.01); *G06V 20/70* (2022.01)

(58) Field of Classification Search
  CPC .......... G06K 9/62; G06T 9/001; G06V 20/70; G06V 20/64; G06V 10/26; G06V 10/806; G06V 10/82
  See application file for complete search history.

(56) References Cited

U.S. PATENT DOCUMENTS

| | | | |
|---|---|---|---|
| 2018/0158200 A1 | 6/2018 | Metzler et al. | |
| 2018/0253622 A1 | 9/2018 | Chen et al. | |
| 2018/0336454 A1 | 11/2018 | Lim et al. | |
| 2019/0147245 A1* | 5/2019 | Qi ........................ | G06V 10/82 |
| | | | 382/103 |

FOREIGN PATENT DOCUMENTS

| | | |
|---|---|---|
| CN | 107704862 A | 2/2018 |
| CN | 108230329 A | 6/2018 |
| CN | 108427951 A | 8/2018 |
| CN | 108460411 A | 8/2018 |
| CN | 108509820 A | 9/2018 |
| CN | 109345540 A | 2/2019 |
| CN | 109886727 A | 6/2019 |

OTHER PUBLICATIONS

Instance-aware Semantic Segmentation, Dai et al, 2015; https://arxiv.org/pdf/1512.04412.pdf (Year: 2015).*
The Japan Patent Office (JPO) Notification of Reasons for Refusal for Application No. 2021-517774 dated Jun. 6, 2022 8 pages (including translation).
Weiyue Wang et al., "SGPN: Similarity Group Proposal Network for 3D Point Cloud Instance Segmentation," 2018 IEEE/CVF Conference on Computer Vision and Pattern Recognition, Jun. 23, 2018, IEEE. 10 pages.
Zhidong Liang et al., "3D Graph Embedding Learning with a Structure-aware Loss Function for Point Cloud Semantic Instance Segmentation," arXiv:1902.05247v1, Feb. 14, 2019. 7 pages.
The World Intellectual Property Organization (WIPO) International Search Report for PCT/CN2020/074637 dated May 7, 2020 6 Pages (including translation).
The State Intellectual Property Office of the People's Republic of China (SIPO) Office Action 1 for for 201910138419.6 dated Jul. 9, 2020 12 Pages (including translation).
Wanyu Jiang , "Object detection and segmentation based on deep learning", Electronics world, Issue 15, Aug. 31, 2018. 4 pages.
Deng Dan, "PixelLink: Natural scene text detection algorithm based on instance segmentation," The Full-text Database of China's Excellent Bachelor Degree Thesis Information Technology Series, Issue 1, Jan. 15, 2019. 77 pages.
Daan De Geus et al., "Panoptic Segmentation with a Joint Semantic and Instance Segmentation Network," arXiv.org, Sep. 6, 2018. 5 pages.
Mingyang Jiang et al., "PointSIFT: A SIFT-like Network Module for 3D Point Cloud Semantic Segmentation", arXiv.org, Nov. 24, 2018. 10 pages.
Weiyue Wang et al., "SGPN: Similarity Group Proposal Network for 3D Point Cloud Instance Segmentation," arXiv.org, Nov. 23, 2017. 13 pages.
Zhidong Liang et al., "3D Graph Embedding Learning with a Structure-aware Loss Function for Point Cloud Semantic Instance Segmentation", arXiv.org, Feb. 14, 2019. 7 pages.
I. Armeni et al. "3D Semantic Parsing of Large-Scale Indoor Spaces," In Proceedings IEEE Conference on Computer Vision and Pattern Recognition, 2016. 10 pages.
L.-C. Chen et al., "Rethinking Atrous Convolution for Semantic Image Segmentation," arXiv:1706.05587v3, Dec. 5, 2017. 14 pages.
D. Comaniciu et al., "Mean Shift: A Robust Approach toward Feature Space Analysis," IEEE Transactions on Pattern Analysis and Machine Intelligence, 2002. 37 pages.
J. Dai et al., "Instance-sensitive Fully Convolutional Networks," arXiv:1603.08678v1, Mar. 29, 2016. 15 pages.
J. Dai et al., "Instance-aware Semantic Segmentation via Multi-task Network Cascades," Proceedings of the IEEE Conference on Computer Vision and Pattern Recognition (CVPR), 2016, pp. 3150-3158. 9 pages.
B. De Brabandere et al., "Semantic Instance Segmentation with a Discriminative Loss Function,". arXiv:1708.02551v1, Aug. 8, 2017. 10 pages.
F. Engelmann et al., "Exploring Spatial Context for 3D Semantic Segmentation of Point Clouds," Proceedings of the IEEE International Conference on Computer Vision (ICCV), 2017, pp. 716-724 9 pages.
R. Girshick et al., "Rich feature hierarchies for accurate object detection and semantic segmentation," arXiv:1311.2524v5, Oct. 22, 2014. 21 pages.
J. Guerry et al., "SnapNet-R: Consistent 3D Multi-View Semantic Labeling for Robotics," In Proceedings of the IEEE International Conference on Computer Vision Workshops, 2017. 10 pages.
K. He et al., "Mask R-CNN," Proceedings of the IEEE International Conference on Computer Vision (ICCV), 2017, pp. 2961-2969. 9 pages.
J. Huang et al., "Point Cloud Labeling using 3D Convolutional Neural Network," In Proceedings International Conference on Pattern Recognition, 2016. 6 pages.
Q. Huang et al.,. "Recurrent Slice Networks for 3D Segmentation of Point Clouds," arXiv:1802.04402, Mar. 29, 2018. 11 pages.
A. Kirillov et al., "Panoptic Segmentation," arXiv:1801.00868v1, Jan. 3, 2018. 9 pages.
A. Krizhevsky et al., "ImageNet Classification with Deep Convolutional Neural Networks," In Proceedings of the International Conference on Neural Information Processing Systems, 2012. 7 pages.
L. Landrieu et al., "Large-scale Point Cloud Semantic Segmentation with Superpoint Graphs," arXiv:1711.09869v2, Mar. 28, 2018. 12 pages.
Y. Li et al., "PointCNN: Convolution On X-Transformed Points," . arXiv:1701.07791v5, Nov. 5, 2018. 14 pages.
G. Lin et al., "RefineNet: Multi-Path Refinement Networks for High-Resolution Semantic Segmentation," In Proceedings of the IEEE Conference on Computer Vision and Pattern Recognition (CVPR), 2017, pp. 1925-1934. 10 pages.
G. Lin et al., "Exploring Context with Deep Structured models for Semantic Segmentation," IEEE Transactions on Pattern Analysis and Machine Intelligence, 2017. 16 pages.

(56) References Cited

OTHER PUBLICATIONS

S. Liu et al., "SGN: Sequential Grouping Networks for Instance Segmentation," In Proceedings of the IEEE International Conference on Computer Vision, 2017. 9 pages.
J. Long et al., "Fully Convolutional Networks for Semantic Segmentation," arXiv"1411.4038v2, Mar. 8, 2015. 10 pages.
L. V. D. Maaten et al., "Visualizing Data using t-SNE," Journal of Machine Learning Research, 2018. 27 pages.
D. Maturana et al., "VoxNet: A 3D Convolutional Neural Network for Real-Time Object," In Proceedings of IEEE/RSJ International Conference on Intelligent Robots and Systems, 2015. 7 pages.
A. Newell et al., "Associative Embedding: End-to-End Learning for Joint Detection and Grouping," arXiv:1611.05424v2, Jun. 9, 2017. 11 pages.
P. O. Pinheiro et al., "Learning to Segment Object Candidates," In Proceedings of Advances in Neural Information Processing Systems, 2015. 9 pages.
C. R. Qi et al., "PointNet: Deep Learning on Point Sets for 3D Classification and Segmentation," arXiv:1612.00593v2, Apr. 10, 2017. 19 pages.
C. R. Qi et al., "Volumetric and Multi-View CNNs for Object Classification on 3D Data," In Proceedings of IEEE Conference on Computer Vision and Pattern Recognition, 2016. 9 pages.
C. R. Qi et al., "PointNet++: Deep Hierarchical Feature Learning on Point Sets in a Metric Space," arXiv:1706.02413v1, Jun. 7, 2017. 14 pages.
M. Ren et al., "End-to-End Instance Segmentation with Recurrent Attention," arXiv:1605.09410v5, Jul. 13, 2017. 12 pages.
G. Riegler et al., "OctNet: Learning Deep 3D Representations at High Resolutions," arXiv:1611.05009v4, Apr. 10, 2017. 21 pages.
B. Shi et al., "DeepPano: Deep Panoramic Representation for 3-D Shape Recognition," IEEE Signal Processing Letters, vol. 22, No. 12, Dec. 2015. 5 pages.
K. Simonyan et al., "Very Deep Convolutional Networks for Large-Scale Image Recognition," arXiv:1409.1556v6, Apr. 10, 2014. 14 pages.
H. Su et al.,. "Multi-view Convolutional Neural Networks for 3D Shape Recognition," In Proceedings of IEEE International Conference on Computer Vision, 2015. 9 pages.
L. Tchapmi et al., "SEGCloud: Semantic Segmentation of 3D Point Clouds," arXiv:1710.07563v1, Oct. 20, 2017. 21 pages.
W. Wang et al., "SGPN: Similarity Group Proposal Network for 3D Point Cloud Instance Segmentation," In Proceedings of the IEEE Conference on Computer Vision and Pattern Recognition (CVPR), 2018, pp. 2569-2578. 10 pages.
Y. Wang et al., "Dynamic Graph CNN for Learning on Point Clouds," arXiv:1801.07829v1, Jan. 24, 2018. 14 pages.
Z. Wu et al., "3D ShapeNets: A Deep Representation for Volumetric Shapes," larXiv:1406.5670v3, Apr. 15, 2015. 9 pages.
X. Ye et al., "3D Recurrent Neural Networks with Context Fusion for Point Cloud Semantic Segmentationn," In Proceedings of the European Conference on Computer Vision, 2018. 15 pages.
L. Yi et al., "A Scalable Active Framework for Region Annotation in 3D Shape Collections," ACM Transactions on Graphics, vol. 35, Issue 6, Nov. 2016 . 12 pages.
W. Zhuo et al., "Indoor Scene Parsing with Instance Segmentation, Semantic Labeling and Support Relationship Inference," In Proceedings of the IEEE Conference on Computer Vision and Pattern Recognition, 2017. 9 pages.

* cited by examiner

POINT CLOUD SEGMENTATION METHOD, COMPUTER-READABLE STORAGE MEDIUM, AND COMPUTER DEVICE

RELATED APPLICATIONS

This application is a continuation application of PCT Application No. PCT/CN2020/074637, entitled "POINT CLOUD SEGMENTATION METHOD, COMPUTER-READABLE STORAGE MEDIUM AND COMPUTER DEVICE" and filed on Feb. 10, 2020, which claims priority to Chinese Patent Application No. 201910138419.6, entitled "POINT CLOUD SEGMENTATION METHOD AND APPARATUS, COMPUTER-READABLE STORAGE MEDIUM, AND COMPUTER DEVICE" filed on Feb. 25, 2019. The two applications are both incorporated by reference in their entirety.

FIELD OF THE TECHNOLOGY

This application relates to the field of computer technologies, and in particular, to a point cloud segmentation method, a computer-readable storage medium, and a computer device.

BACKGROUND OF THE DISCLOSURE

With the development of computer technologies, the quantity of digital images grows increasingly, and the demand for digital image processing technologies also grows increasingly. For example, a digital image may be represented by a point cloud. A point cloud refers to a set of massive points expressing a target spatial distribution and target surface features in the same spatial reference system. After spatial coordinates of each sampling point on a surface of an object are obtained, a set of points is obtained and is referred to as a point cloud. The segmentation processing of a point cloud is an important branch in the digital image processing technologies.

Segmentation (for example, instance segmentation) of a point cloud usually relies on a feature-based similarity matrix. However, this segmentation method is usually time-consuming, resulting in low efficiency of point cloud segmentation. This phenomenon is especially obvious when the point cloud includes a relatively large quantity of points.

SUMMARY

Embodiments of this application provide a point cloud segmentation method, a computer-readable storage medium, and a computer device, to improve efficiency of point cloud segmentation.

One aspect of the present disclosure provides a point cloud segmentation method. The method includes encoding a to-be-processed point cloud to obtain a shared feature, the shared feature referring to a feature shared at a semantic level and at an instance level; decoding the shared feature to obtain a semantic feature and an instance feature respectively; adapting the semantic feature to an instance feature space and fusing the semantic feature with the instance feature, to obtain a semantic-fused instance feature of the point cloud, the semantic-fused instance feature representing an instance feature fused with the semantic feature; dividing the semantic-fused instance feature of the point cloud, to obtain a semantic-fused instance feature of each point in the point cloud; and determining an instance category to which each point belongs according to the semantic-fused instance feature of each point.

Another aspect of the present disclosure provides a non-transitory computer-readable storage medium is provided, storing a computer program, the computer program, when executed by a processor, causing the processor to perform operations of the foregoing point cloud segmentation method.

Another aspect of the present disclosure provides a computer device. The computer device includes a memory and a processor, the memory storing a computer program, the computer program, when executed by the processor, causing the processor to perform operations of the foregoing point cloud segmentation method.

According to the foregoing point cloud segmentation method and apparatus, the computer-readable storage medium, and the computer device, the to-be-processed point cloud is first encoded to obtain the shared feature. Then the shared feature is decoded by using different decoding branches, to obtain the semantic feature and the instance feature respectively. The semantic feature is adapted to the instance feature space and fused with the instance feature, to obtain the instance feature with rich semantic awareness of the point cloud. Then the instance feature with rich semantic awareness of the each point in the point cloud is obtained, and the instance category to which the each point belongs can be determined. Accordingly, point cloud segmentation consistent with embodiments of the present disclosure no longer relies on a feature-based similarity matrix, thereby improving efficiency of point cloud segmentation. In addition, the instance feature with rich semantic awareness is learned, so that instance segmentation can benefit from semantic segmentation, thereby improving accuracy of point cloud segmentation.

DESCRIPTION OF EMBODIMENTS

Figure 1:
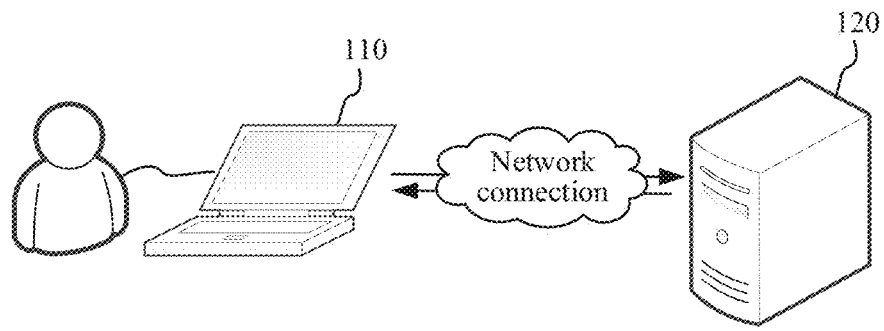
FIG. 1 is a diagram of an application environment of a point cloud segmentation method in an embodiment.

To make the objectives, technical solutions, and advantages of this application clearer, the following further describes this application in detail with reference to the accompanying drawings and the embodiments. It is to be understood that the specific embodiments described herein are merely used to explain this application but are not intended to limit this application.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as the computer vision (CV) technology, a speech processing technology, a natural language processing technology, and machine learning/deep learning.

CV is a science that studies how to use a machine to "see", and to be specific, a science that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, smart customer service, and augmented reality. It is believed that with the development of technologies, the AI technology will be applied to more fields, and play an increasingly important role.

The solutions provided in the embodiments of this application relate to technologies, for example, CV of AI, which are specifically described by using the following embodiments:

FIG. 1 is a diagram of an application environment of a point cloud segmentation method in an embodiment. Referring to FIG. 1, the point cloud segmentation method is applied to a point cloud segmentation system. The point cloud segmentation system includes a terminal 110 and a server 120. The terminal 110 and the server 120 are connected by using a network. In an example, the terminal 110 may be specifically a desktop terminal or a mobile terminal, and the mobile terminal may be at least one of a mobile phone, a tablet computer, a notebook computer, and the like.

The server 120 may be implemented by using an independent server or a server cluster that includes a plurality of servers. This is not specifically limited in this embodiment of this application.

The point cloud segmentation method in this embodiment of this application may be executed by the terminal 110 or the server 120 separately, or may be executed jointly by the terminal 110 and the server 120. This is not specifically limited in this embodiment of this application.

In one embodiment, point clouds in this embodiment of this application include two-dimensional point clouds, three-dimensional point clouds, or the like. A two-dimensional point cloud may be, for example, a set of pixels in a two-dimensional image. A three-dimensional point cloud may be, for example, a set of three-dimensional points in a three-dimensional scene.

The point cloud segmentation in this embodiment of this application includes semantic segmentation and instance segmentation.

The semantic segmentation may refer to segmenting a point cloud into a plurality of non-overlapping point groups with certain semantics while performing semantic annotation on the point groups. Essentially, the semantic segmentation implements point-level classification. Semantic annotation of an entire point cloud is implemented by classifying each point. For example, in a two-dimensional image or a three-dimensional scene, it is distinguished which points belong to a cat, which points belong to a pen, or which points belong to a balloon.

An instance refers to a specific object that belongs to a type. A specific object may be considered as an instance, for example, a cat, a pen, or a balloon. The instance segmentation may refer to segmenting a point cloud into a plurality of non-overlapping point groups belonging to a specific object, and one point group corresponds to one instance. For example, in a two-dimensional image or a three-dimensional scene, it is distinguished which points belong to a specific object, which points belong to another specific object, or the like.

The instance segmentation may alternatively be combined with the semantic segmentation, to distinguish semantic categories of instances based on the semantic segmentation. For example, when there is a plurality of cats in a two-dimensional image or a three-dimensional scene, through the instance segmentation combined with a semantic segmentation result, it can be distinguished which points belong to a first cat and which points belong to a second cat among points belonging to the cats.

Figure 2:
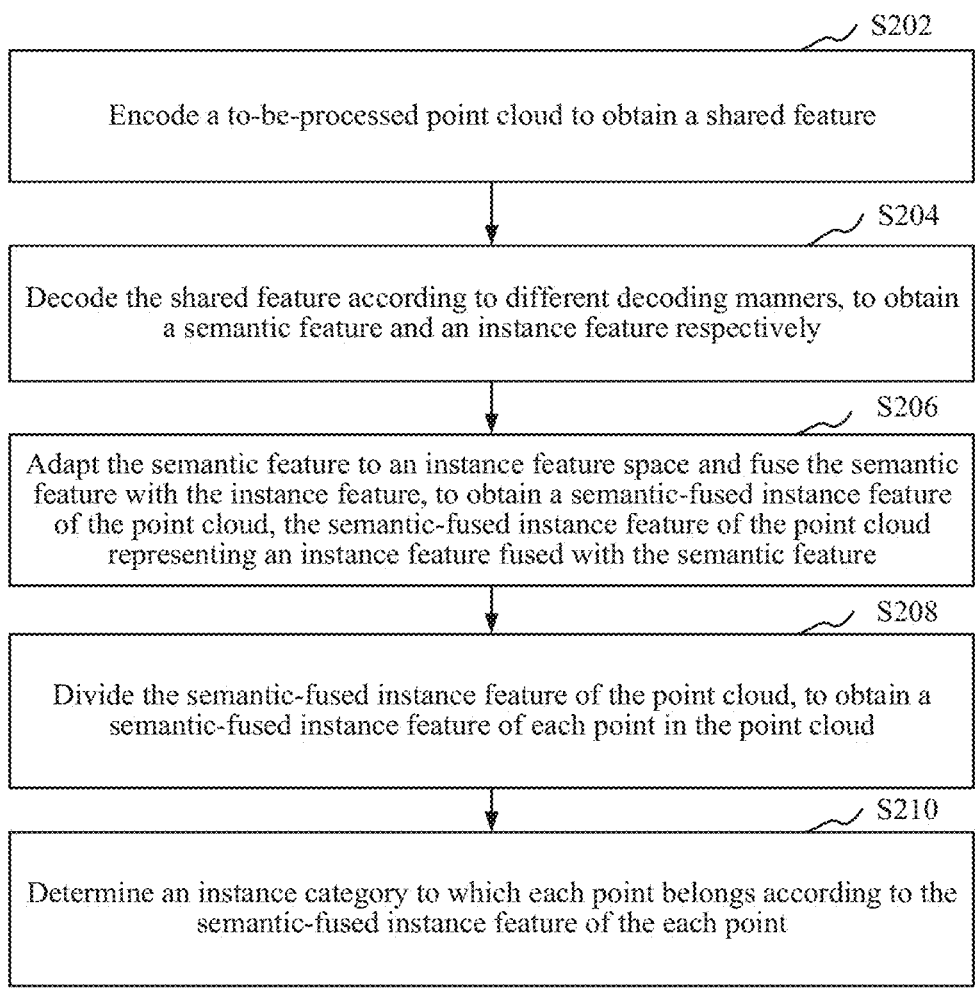
FIG. 2 is a schematic flowchart of a point cloud segmentation method in an embodiment.

As shown in FIG. 2, in one embodiment, this embodiment of this application provides a point cloud segmentation method. This embodiment is mainly described by using an example that the method is applied to a computer device. The computer device may be the terminal 110 or the server 120 in FIG. 1. Referring to FIG. 2, the point cloud segmentation method includes the following steps:

S202. Encode a to-be-processed point cloud to obtain a shared feature.

The shared feature refers to a feature shared at a semantic level and an instance level. In other words, a semantic feature and an instance feature can be separately obtained through processing based on the shared feature. The semantic feature refers to data showing semantic characteristics of the point cloud, and the instance feature refers to data showing instance characteristics of the point cloud.

After obtaining the to-be-processed point cloud, the computer device performs feature data extraction on the to-be-processed point cloud, and then encodes extracted feature data to obtain the shared feature. It may be understood that the shared feature may be a high-dimensional expression of characteristics of the point cloud, covering information of the entire point cloud; and the shared feature may alternatively be a low-dimensional expression of characteristics of the point cloud, covering the information of the entire point cloud as well. There may be a plurality of types of data formats for the shared feature. For example, the shared feature may be in the form of a matrix, that is, a shared feature matrix.

In one embodiment, the computer device may select a deep learning network as a feature encoder, and use the feature encoder to perform feature data extraction and encoding on the to-be-processed point cloud to obtain the shared feature. In an example, the deep learning network used as the feature encoder may be a front half of a PointNet network, or a front half of a PointNet++ network, or another network structure. The PointNet network is a point cloud processing network formed by a multi-layer perceptron and maximum pooling, and the PointNet++ network is an improvement of the PointNet network.

For example, assuming that the computer device uses the PointNet network as the feature encoder, then the shared feature matrix refers to output of a network layer where local features and global features are merged in the PointNet network. In this case, the feature encoder is a network structure from the first network layer of the PointNet network to the network layer where local features and global features are merged. Assuming that the computer device uses the PointNet++ network as the feature encoder, then the shared feature matrix refers to output of the last set abstraction module in the PointNet++ network. In this case, the feature encoder is a network structure from the first network layer of the PointNet++ network to the last set abstraction module.

In one embodiment, S202 includes: obtaining the to-be-processed point cloud; combining a coordinate feature and a channel feature of each point in the to-be-processed point cloud, to obtain an initial feature of the corresponding point; and jointly encoding the initial features of the points, to obtain the shared feature corresponding to the to-be-processed point cloud.

The coordinate feature of the point may be a coordinate position of the point. The channel feature of the point may be a channel value of the point, such as a color channel value. Combining the coordinate feature and the channel feature may be splicing each coordinate position and each channel value. The initial feature of the point is a feature used for feature extraction and encoding.

For example, a coordinate feature of a three-dimensional point in a three-dimensional point cloud is a coordinate position x of a coordinate dimension X, a coordinate position y of a coordinate dimension Y, and a coordinate position z of a coordinate dimension Z; and a channel feature of the three-dimensional point in the three-dimensional point cloud is a channel value r of an R color channel, a channel value g of a G color channel, and a channel value b of a B color channel. The coordinate feature and the channel feature of the three-dimensional point in the three-dimensional point cloud is combined to be (x, y, z, r, g, b).

After obtaining the to-be-processed point cloud, the computer device may combine the coordinate feature and the channel feature of each point in the point cloud, to obtain the initial feature of the point. The computer device then jointly encodes the initial features of all points in the point cloud to obtain the shared feature.

In one embodiment, the computer device may jointly input the initial features of all the points in the point cloud into a feature encoder, and the initial features of all the points are processed by using the feature encoder to output the shared feature matrix. For example, the to-be-processed point cloud is a point cloud with a size of $N_P$, that is, the point cloud includes $N_P$ points. The computer device encodes the to-be-processed point cloud. In other words, initial features of the $N_P$ points, that is, $N_P$ (x, y, z, r, g, b), are inputted to the feature encoder for processing. In other words, an initial feature of each three-dimensional point may be an initial feature vector of 1×6, and initial features of all three-dimensional points in the three-dimensional point cloud may be combined into an initial feature matrix of $N_P$×6 to be inputted to the feature encoder for processing.

Certainly, in another exemplary embodiment, the to-be-processed point cloud may alternatively be a two-dimensional point cloud, and the coordinate feature in this case only includes two dimensions. In addition, the channel feature may alternatively be a YUV three-color channel, a gray-scale channel, or the like. This is not specifically limited in this embodiment of this application.

In the foregoing embodiment, the initial features of the points in the point cloud are reflected by two different feature levels: the coordinate level and the channel level. Then the initial features including the two feature levels are encoded, to extract richer feature data reflective of point cloud characteristics, greatly facilitating subsequent segmentation processing of the point cloud.

Figure 3:
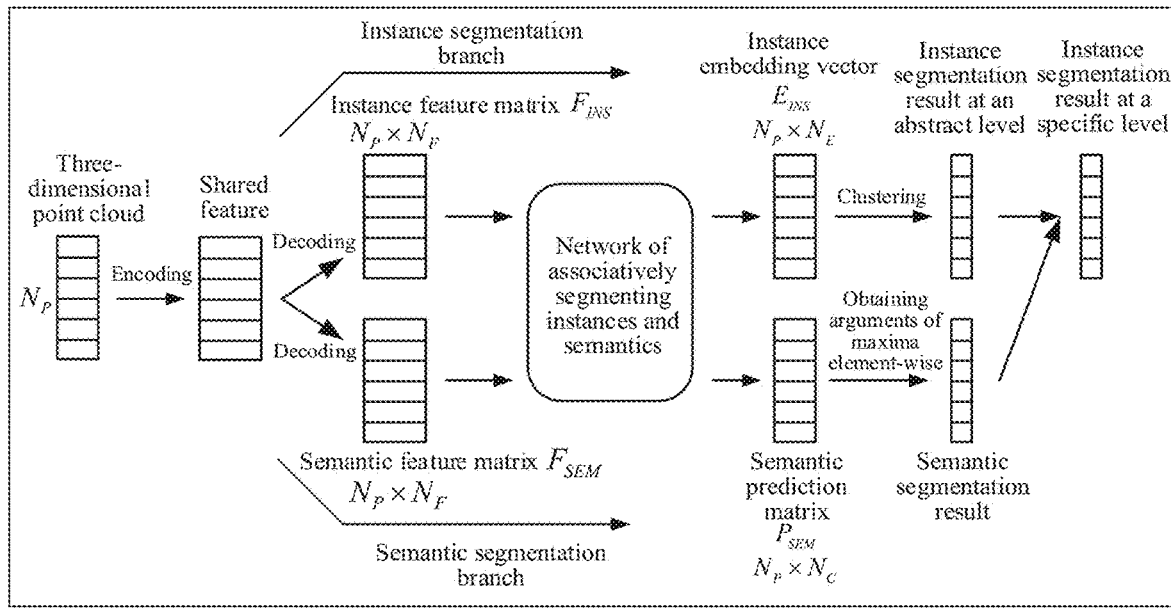
FIG. 3 is a schematic diagram of point cloud segmentation in an embodiment.

For example, FIG. 3 is a schematic diagram of point cloud segmentation in one embodiment. Referring to FIG. 3, it is assumed that the to-be-processed point cloud in this embodiment of this application is a three-dimensional point cloud with a size of $N_P$, the computer device encodes initial features (x, y, z, r, g, b) of $N_P$ three-dimensional points by using a feature encoder (for example, the front half of the PointNet network), to obtain a shared feature matrix $F_{share}$.

S204. Decode the shared feature according to different decoding methods, to obtain a semantic feature and an instance feature respectively.

It may be understood that the semantic feature and the instance feature are features at two different feature levels. To decode features at different feature levels from the same data, generally, decoding needs to be performed in different decoding methods separately, to obtain different results.

The decoding methods may differ in decoding principles. For example, the decoding is performed by using a deep learning network or through logistic regression. The decoding methods may alternatively differ in network structures. For example, the decoding is performed by using deep learning networks with different structures. The decoding methods may alternatively differ in network structure parameters. For example, the decoding is performed by using deep learning networks with the same model structure but different network structure parameters.

The computer device may decode the shared feature in parallel according to two different decoding methods separately, extract different information from the shared feature, and obtain the semantic feature and the instance feature respectively according to the extracted two different types of information. It may be understood that the semantic feature may be a high-dimensional expression of semantic characteristics of the point cloud, covering information of the semantic level of the entire point cloud; and the semantic feature may alternatively be a low-dimensional expression of semantic characteristics of the point cloud, covering the information of the semantic level of the entire point cloud as well. The instance feature may be a high-dimensional expression of instance characteristics of the point cloud, covering information of the instance level of the entire point cloud; and the instance feature may alternatively be a low-dimensional expression of instance characteristics of the point cloud, covering the information of the instance level of the entire point cloud as well. There may be a plurality of types of data formats for the semantic feature and the instance feature. For example, the semantic feature and the instance feature may be in the form of matrices, that is, a semantic feature matrix and an instance feature matrix. This is not specifically limited in this embodiment of this application.

In one embodiment, S204 includes: decoding the shared feature by using a first decoding structure to obtain the semantic feature; and decoding the shared feature by using a second decoding structure to obtain the instance feature, where the first decoding structure and the second decoding structure include a same structure and different decoding parameters.

The first decoding structure and the second decoding structure are two types of decoding structures with the same structure but different structure parameters. For example, the computer device may select the front half of the PointNet network as a decoder to decode the shared feature. Then the pointNet network that performs decoding to obtain the semantic feature has different network parameters from the PointNet network that performs decoding to obtain the instance feature. The network parameters are obtained through sample data training.

The computer device may decode the shared feature by using the first decoding structure to obtain the semantic feature, and decode the shared feature by using the second decoding structure to obtain the instance feature in parallel.

In one embodiment, the computer device may select deep learning networks as the feature encoder and two parallel feature decoders, encode the point cloud by using the feature encoder to obtain the shared feature, and decode the shared feature by using the two parallel feature decoders to obtain the semantic feature and the instance feature. The feature encoder may be the front half of the PointNet network or the front half of the PointNet++ network, and the two parallel feature decoders may be a rear half of the PointNet network or a rear half of the PointNet++ network. Certainly, the feature encoder and the two parallel feature decoders may alternatively be other network structures. This is not specifically limited in this embodiment of this application.

In this embodiment of this application, the shared feature may be decoded based on decoding structures with the same structure but different parameters. The semantic feature and the instance feature obtained in this way match in feature expressions and feature dimensions, thereby facilitating subsequent feature fusion at the two feature levels, and improving the accuracy of point cloud segmentation. Moreover, training of two decoding structures with the same structure is more convenient than training of decoding structures with different structures or different principles.

Still referring to FIG. 3, after obtaining the shared feature matrix $F_{share}$, the computer device may decode the shared feature matrix $F_{share}$ by using two different branches in parallel. That is, the shared feature matrix $F_{share}$ is decoded into a semantic feature matrix $F_{SEM}$ with a size of $N_P \times N_F$ by using a decoding structure of a semantic segmentation branch, and the shared feature matrix $F_{share}$ is decoded into an instance feature matrix $F_{INS}$ with a size of $N_P \times N_F$ by using a decoding structure of an instance segmentation branch. $N_F$ is the number of dimensions of a feature, and a value thereof may be 128, 256, or the like. For example, an initial feature of a three-dimensional point is (x, y, z, r, g, b) including 6 values, and then the number of dimensions of the feature is 6.

S206. Adapt the semantic feature to an instance feature space and fuse the semantic feature with the instance feature, to obtain a semantic-fused instance feature of the point cloud, the semantic-fused instance feature of the point cloud representing an instance feature fused with the semantic feature.

It may be understood that a process of extracting a feature from input data may be considered as mapping the input data in one space to another higher or lower dimensional space. The space where the input data is located is an input space, and a space where an extracted feature is located is a feature space. The feature in the feature space is a higher or lower dimensional abstract expression of the input data. There are different features, and feature spaces are also different. A space where all instance features are located is the instance feature space, and a space where all semantic features are located is the semantic feature space. Features of different feature spaces may be transformed into each other due to the presence a mapping relationship.

The computer device can map an obtained semantic feature to the instance feature space through the mapping relationship between the semantic feature space and the instance feature space, to obtain a transformed feature that can not only express semantics and but also adapt to the instance feature space, and then fuse the transformation feature and the instance feature to obtain an instance feature with rich semantic awareness. In other words, the instance feature fused with the semantic feature is obtained.

In one embodiment, the semantic feature is a semantic feature matrix, and the instance feature is an instance feature matrix. The adapting the semantic feature to an instance feature space and fusing the semantic feature with the instance feature, to obtain a semantic-fused instance feature includes: adapting the semantic feature matrix to the instance feature space by using an independent first fully connected layer (FC) of each point; and performing element-wise addition on the semantic feature matrix adapted to the instance feature space and the instance feature matrix, to obtain a first matrix, the first matrix being a semantic-fused instance feature matrix.

In this embodiment of this application, the semantic feature and the instance feature are in the form of matrices. The mapping relationship between the semantic feature space and the instance feature space is realized by the independent fully connected layer of each point. The independent fully connected layer of each point means that full connection processing is performed for each point separately. The computer device inputs the semantic feature matrix into the independent first fully connected layer of each point, and processes the semantic feature matrix by using the first fully connected layer, to output the semantic feature matrix adapted to the instance feature space.

In one embodiment, a calculation formula of the semantic-fused instance feature matrix is as follows:

$$F_{SINS}=F_{INS}+FC(F_{SEM}) \qquad (1)$$

$F_{SINS}$ is a semantic-fused instance feature matrix, $F_{INS}$ is an instance feature matrix, $F_{SEM}$ is a semantic feature matrix, and $FC(F_{SEM})$ is a semantic feature matrix adapted to the instance feature space.

In one embodiment, a network structure of the independent first fully connected layer of each point includes a normalization layer and an activation layer, and the two network layers sequentially process inputted data. An activation function of the activation layer may be a ReLU activation function, or the like. This is not specifically limited in this embodiment of this application.

Further, the computer device may perform element-wise addition on the semantic feature matrix adapted to the instance feature space and the instance feature matrix, to obtain the semantic-fused instance feature matrix. The element-wise addition refers to addition of matrix elements in the same matrix element position.

For example, for a matrix $$F1 = \begin{pmatrix} 1 & 2 \\ 3 & 4 \end{pmatrix}$$

and a matrix $$F2 = \begin{pmatrix} 4 & 3 \\ 2 & 1 \end{pmatrix},$$

the element-wise addition is performed on the matrix F1 and the matrix F2 to obtain a matrix $$F = \begin{pmatrix} 1+4 & 2+3 \\ 3+2 & 4+1 \end{pmatrix} = \begin{pmatrix} 5 & 5 \\ 5 & 5 \end{pmatrix}.$$

In this embodiment of this application, because the semantic feature and the instance feature are features with different meanings, there are certain obstacles in feature fusion. In this case, the semantic feature is adapted to the instance feature space by using the fully connected layer, thereby overcoming the obstacles in feature fusion, and the instance feature with rich semantic awareness can be obtained, which is helpful for subsequent segmentation processing.

Figure 4:
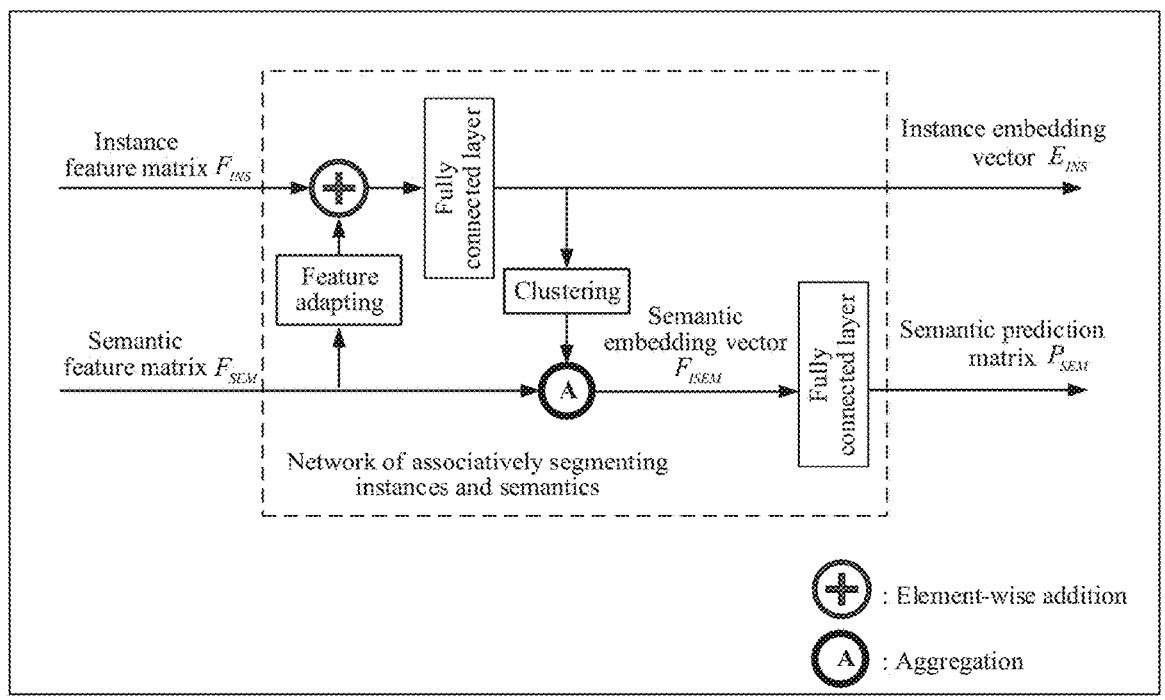
FIG. 4 is a schematic diagram of a network structure of associatively segmenting instances and semantics (ASIS) in an embodiment.

In one embodiment, the computer device may implement feature fusion processing by using a network structure of associatively segmenting instances and semantics (ASIS). FIG. 4 is a schematic diagram of a network structure of associatively segmenting instances and semantics in one embodiment. Referring to FIG. 4, the network structure of associatively segmenting instances and semantics simultaneously receives the semantic feature matrix $F_{SEM}$ and the instance feature matrix $F_{INS}$ that are jointly used as an input, and adapts the semantic feature matrix $F_{SEM}$ to the instance feature space to be added element-wise with the instance feature matrix $F_{INS}$, to obtain the semantic-fused instance feature matrix $F_{SINS}$. The process of adapting the semantic feature matrix $F_{SEM}$ to the instance feature space may be realized by using the independent fully connected layer of each point.

S208. Divide the semantic-fused instance feature of the point cloud, to obtain a semantic-fused instance feature of each point in the point cloud.

It may be understood that the semantic-fused instance feature obtained in S206 corresponds to the entire to-be-processed point cloud. Herein, the semantic-fused instance feature of the entire point cloud is processed, to obtain a semantic-fused instance feature of each point in the to-be-processed point cloud through division.

In one embodiment, S208 includes: inputting the first matrix into an independent second fully connected layer of each point; and sequentially processing the first matrix by using a normalization layer and an activation layer included in the second fully connected layer, to obtain a first vector of each point in the to-be-processed point cloud, the first vector being a semantic-fused instance feature vector.

In this embodiment of this application, the semantic-fused instance feature of the entire point cloud is processed by using the independent fully connected layer of each point, to obtain a semantic-fused instance feature of each point in the to-be-processed point cloud through division. The computer device inputs the semantic-fused instance feature matrix of the entire point cloud into the independent second fully connected layer of each point, and processes the semantic-fused instance feature matrix of the entire point cloud by using the second fully connected layer, to output a semantic-fused instance feature of each point in the to-be-processed point cloud.

In one embodiment, a network structure of the independent second fully connected layer of each point includes a normalization layer and an activation layer, and the two network layers sequentially process inputted data. An activation function of the activation layer may be specifically a ReLU activation function, or the like. This is not specifically limited in this embodiment of this application.

In this embodiment of this application, after the semantic-fused instance feature of the entire point cloud is obtained, the first vector of each point is obtained by using the fully connected layer, to ensure smooth proceeding of subsequent instance segmentation.

Still referring to FIG. 4, after obtaining the semantic-fused instance feature matrix $F_{SINS}$ by using the network structure of associatively segmenting instances and semantics, the computer device outputs an instance embedding vector $E_{INS}$ of the point cloud by using the independent fully connected layer of each point. The size of $E_{INS}$ is $N_P \times N_E$, and the number of dimensions of the embedding vector is $N_E$. The instance embedding vector of the point cloud may be understood as a set of first vectors ($1 \times N_E$) of points ($N_P$ points). Still referring to FIG. 3, after the semantic feature matrix $F_{SEM}$ and the instance feature matrix $F_{INS}$ are inputted to the network structure of associatively segmenting instances and semantics, one of the outputs is obtained: the instance embedding vector $E_{INS}$ of the point cloud, that is, the first vector of each point in the point cloud.

S210. Determine an instance category to which each point belongs according to the semantic-fused instance feature of each point.

The instance category to which each point belongs may be an instance category at an abstract level. For example, the instance category may be a first instance category or a second instance category. For example, the term "abstract" herein refers to knowing that this is an instance, but not knowing which instance it is specifically, for example, knowing that it is a natural person but not knowing a name thereof. The instance category to which each point belongs may alternatively be an instance category at a specific level. For example, the instance category may be a first cat or a second cat.

It may be understood that the instance embedding vector of the point cloud represents an instance relationship of points included in the point cloud: points belonging to the same instance are close to each other in an instance embedding vector space, while points belonging to different instances are far away from each other. Then, the instance category at the abstract level to which each point belongs may cluster points according to the semantic-fused instance feature of each point, to obtain a plurality of sets of points, that is, the points are grouped according to instances, and each set of points corresponds to an instance category. The instance category at the specific level to which each point belongs needs to be determined with reference to a semantic segmentation result.

In one embodiment, S210 includes: separately calculating feature distances between the semantic-fused instance feature of each point in the point cloud and semantic-fused instance features of other points in the point cloud except each point; and clustering all points in the point cloud according to the feature distances obtained through calculation, to obtain a plurality of sets of points, each set of points in the plurality of sets of points being corresponding to an instance category.

The computer device may separately calculate feature distances between the semantic-fused instance feature of each point in the point cloud and semantic-fused instance features of other points in the point cloud except each point. The feature distances are vector distances between the semantic-fused instance feature vector of each point and semantic-fused instance feature vectors of other points in the point cloud except each point. For example, the vector distances herein may be Euclidean distances or other distances. This is not specifically limited in this embodiment of this application. Through the foregoing calculation process, a feature distance between any two points in the point cloud can be calculated.

Further, after calculating the feature distance between any two points in the point cloud, the computer device clusters all the points in the point cloud to obtain a plurality of sets of points, where each set of points in the plurality of sets of points corresponds to an instance category, thereby completing the instance segmentation of the points in the point cloud, and realizing instance division at the abstract level. In other words, a clustering result indicates which points belong to the same instance. An algorithm for clustering points may be a mean-shift clustering algorithm, a k-neighbor clustering algorithm, or the like. This is not specifically limited in this embodiment of this application.

For example, there are 10 points in a point cloud. It is obtained through clustering that 3 points belong to a first instance, another 3 points belong to a second instance, and the remaining 4 points belong to a third instance. This is the instance segmentation at the abstract level.

Still referring to FIG. 3, after obtaining the first vector of each point in the point cloud, that is, the instance embedding vector $E_{INS}$ of the point cloud, the computer device may cluster the semantic-fused instance features of the points, to obtain an instance segmentation result at the abstract level, and determine which points belong to the same instance category.

After clustering all the points in the point cloud and obtaining which points belong to the same instance category, the computer device may determine a specific instance category of the instance with reference to the semantic segmentation result of the points in the instance. For example, there are 10 points in a point cloud. It is obtained through clustering that 3 points belong to a first instance, another 3 points belong to a second instance, and the remaining 4 points belong to a third instance. In this case, if a semantic segmentation result of the 3 points in the first instance is a cat, the first instance is a first cat, and an instance category of the points in this instance is the first cat. If a semantic segmentation result of the 3 points in the second instance is a cat, the second instance is a second cat, and an instance category of the points in this instance is the second cat. If a semantic segmentation result of the 4 points in the third instance is a cat, the third instance is a third cat, and an instance category of the points in this instance is the third cat. This is the instance segmentation result at the specific level. For the semantic segmentation of points in the point cloud, reference may be made to the subsequent embodiments.

According to the foregoing point cloud segmentation method, the to-be-processed point cloud is first encoded to obtain the shared feature; then the shared feature is decoded by using different decoding branches, to obtain the semantic feature and the instance feature respectively; the semantic feature is adapted to the instance feature space and fused with the instance feature, to obtain the instance feature with rich semantic awareness of the point cloud; then the instance feature with rich semantic awareness of each point in the point cloud is obtained, and the instance category to which each point belongs can be determined. Accordingly, point cloud segmentation no longer relies on a feature-based similarity matrix, thereby improving efficiency of point cloud segmentation. In addition, the instance feature with rich semantic awareness is learned, so that instance segmentation can benefit from semantic segmentation, thereby greatly improving accuracy of point cloud segmentation.

Figure 5:
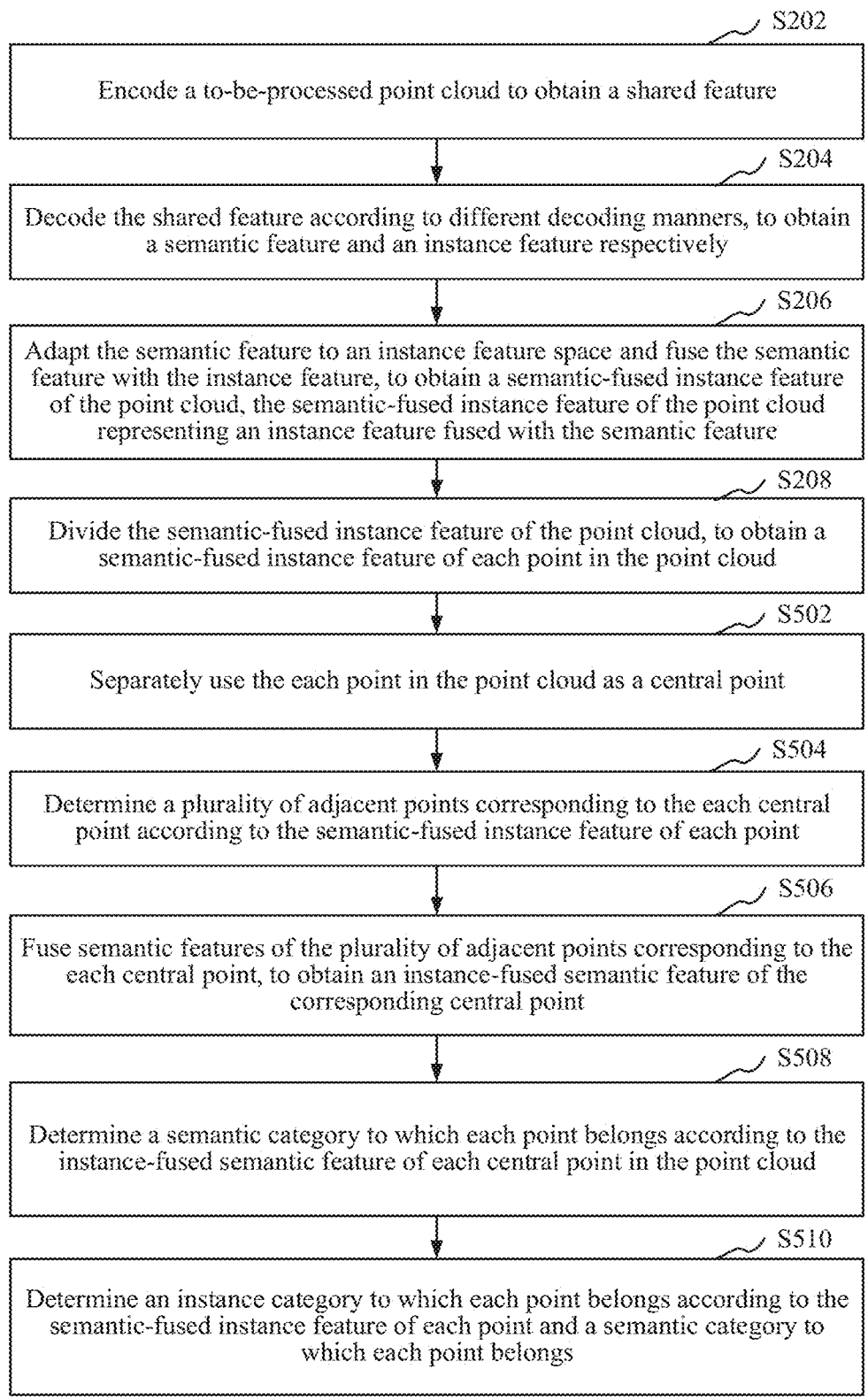
FIG. 5 is a schematic flowchart of a point cloud segmentation method in another embodiment.

As shown in FIG. 5, in one embodiment, the point cloud segmentation method provided in this embodiment of this application further includes steps of semantic segmentation. The steps of semantic segmentation include the following steps:

S502. Separately use each point in the point cloud as a central point.

The foregoing embodiment is a process of fusing the semantic feature into the instance feature to perform instance segmentation when intending to perform instance segmentation on the point cloud. This embodiment and the subsequent embodiment are a process of fusing the instance feature into the semantic feature to perform semantic segmentation when intending to perform semantic segmentation on the point cloud.

It may be understood that when a distance between semantic-fused instance features corresponding to any two points in the point cloud in the instance embedding vector space meets a distance condition, one of the points is determined to be an adjacent point of the other point. The instance embedding vector space is a space where the instance feature embedded with the semantic feature is located, that is, a space where the semantic-fused instance feature is located. Points belonging to the same instance are to be fused for semantic segmentation. Points belonging to the same instance are close to each other in the instance embedding vector space, points belonging to different instances are far away from each other. Therefore, the points in the point cloud may be clustered in units of instances according to the feature distances between the semantic-fused instance features of points, to perform subsequent semantic segmentation.

After obtaining the semantic-fused instance feature of each point in the point cloud through processing, the computer device may perform clustering with each point in the point cloud as a central point according to the feature distances between the semantic-fused instance features of the points in the point cloud, and find a plurality of adjacent points (including the central point itself) adjacent to each point. The plurality of adjacent points form a set of points, and a set of points may be considered as a local point cloud.

S504. Determine a plurality of adjacent points corresponding to each central point according to the semantic-fused instance feature of each point.

In one embodiment, the determining a plurality of adjacent points corresponding to each central point according to the semantic-fused instance feature of each point includes: separately calculating a feature distance between each central point and each point in the point cloud according to the semantic-fused instance feature of each point; and selecting a plurality of points whose feature distances from the central point are less than a preset distance as the plurality of adjacent points corresponding to the central point.

The computer device may separately use each point in the point cloud as a central point, and separately calculate feature distances between the semantic-fused instance feature of the central point and semantic-fused instance features of other points in the point cloud except the central point. The feature distances are vector distances between the semantic-fused instance feature vector of the central point and semantic-fused instance feature vectors of other points in the point cloud except the central point.

Further, after calculating feature distances from other points to each central point, the computer device screens out a preset quantity (K) of points with relatively small distances as a plurality of adjacent points (including the central point itself) of the central point. To ensure that the selected K points belong to the same instance, a threshold $\delta_v$ may be used to filter outer points. For example, a value of $\delta_v$ may be 0.5. This is not specifically limited in this embodiment of this application.

In this embodiment of this application, by point clustering, the points in the point cloud are grouped according to instances. Accordingly, when the instance feature is fused into the semantic feature, the points belonging to the same instance may be fused for semantic segmentation, so that the semantic segmentation benefits from the instance feature, thereby improving the accuracy of semantic segmentation.

In one embodiment, the quantity of adjacent points of each point in the point cloud may be the same or different. This is not specifically limited in this embodiment of this application.

Still referring to FIG. 4, after obtaining the instance embedding vector $E_{INS}$ of the point cloud, that is, the semantic-fused instance feature vector of each point in the point cloud, the computer device may find, for each point, a preset quantity (K) of adjacent points (including the point itself) in the instance embedding vector space by using a k-Nearest Neighbor (kNN) algorithm according to the semantic-fused instance feature vector of each point in the point cloud.

S506. Fuse semantic features of the plurality of adjacent points corresponding to each central point, to obtain an instance-fused semantic feature of the corresponding central point.

It may be understood that each central point and a plurality of adjacent points thereof belong to the same instance, and points belonging to the same instance may be fused for semantic segmentation. Then, for each central point, the plurality of adjacent points of the central point may be fused to obtain the instance-fused semantic feature of the corresponding central point. The instance-fused semantic feature is a semantic feature fused with the instance feature.

In one embodiment, the decoding the shared feature according to different decoding methods, to obtain a semantic feature and an instance feature respectively includes: decoding the shared feature in a first decoding method to obtain a semantic feature matrix of the point cloud; and decoding the shared feature in a second decoding method different from the first decoding method to obtain an instance feature matrix of the point cloud, the semantic feature matrix including a semantic feature vector of each point in the point cloud.

The computer device decodes the shared feature according to the first decoding method and obtains the semantic feature matrix of the point cloud. The semantic feature matrix of the point cloud may be considered as a set of semantic feature vectors of points in the point cloud. For example, the computer device decodes a shared feature matrix to obtain a semantic feature matrix ($F_{SEM}$ with a size of $N_P \times N_F$), that is, a semantic feature vector (with a size of $1 \times N_F$) of points ($N_P$ points).

In one embodiment, the fusing semantic features of the plurality of adjacent points, to obtain an instance-fused semantic feature of the corresponding central point includes: performing element-wise aggregation on semantic feature vectors of the plurality of adjacent points corresponding to each central point, to obtain a second vector of the corresponding central point, the second vector being an instance-fused semantic feature vector.

Further, after obtaining a plurality of adjacent points of each point in the point cloud, the computer device performs element-wise aggregation on semantic feature vectors of the plurality of adjacent points, to obtain a second vector of the point, the second vector being an instance-fused semantic feature vector. The element-wise aggregation on the semantic feature vectors of the plurality of adjacent points may refer to an element-wise maximum confluence operation, that is, a maximum value is obtained element-wise. For example, for a vector X1=(1,2,3), a vector X2=(3,4,5), a vector X1=(2,6,1), a maximum value obtained element-wise from the three vectors is X=(3,6,5).

In this embodiment of this application, by point clustering, the points in the point cloud are grouped according to instances. Accordingly, when the instance feature is fused into the semantic feature, the points belonging to the same instance may be fused for semantic segmentation, so that the semantic segmentation benefits from the instance feature, thereby improving the accuracy of semantic segmentation.

It may be understood that after the points in the point cloud are clustered, each point corresponds to an index matrix. The index matrix is used as a basis for feature fusion, and the index matrix represents a neighbor relationship between points in a point cloud. In other words, an index matrix of a point points to a plurality of adjacent points of the point. The semantic feature vectors of the points in the point cloud are combined into feature tensors with a size of $N_P \times K \times N_F$. The feature tensor explicitly describes a local point cloud of each point. In other words, there are $N_P$ sets of semantic feature vectors, and each set includes K semantic feature vectors. K is the quantity of adjacent points of a point.

Still referring to FIG. 4, after finding, for each point, a preset quantity (K) of adjacent points (including the point itself) in the instance embedding vector space, the computer device performs element-wise aggregation on semantic feature vectors of the K adjacent points as an instance-fused semantic feature vector of the central point of the K adjacent points, to obtain the semantic embedding vector $F_{ISEM}$ of the point cloud, that is, a set of instance-fused semantic feature vectors of all points in the point cloud.

S508. Determine a semantic category to which each point belongs according to the instance-fused semantic feature of each central point in the point cloud.

It may be understood that each point in the point cloud may be used as a central point, so each point in the point cloud corresponds to a plurality of adjacent points, that is, an instance-fused semantic feature may be calculated for each point in the point cloud. Then, for each point in the point cloud, a semantic category to which the point belongs may be determined according to an instance-fused semantic feature thereof.

In one embodiment, the determining a semantic category to which each point belongs according to the instance-fused semantic feature of each point in the point cloud includes: converting the instance-fused semantic feature of each central point into a corresponding semantic prediction vector by using an independent third fully connected layer of each point; and using a semantic category corresponding to a maximum vector element in the semantic prediction vector of each central point as the semantic category to which each point belongs.

In this embodiment of this application, the semantic segmentation processing of the points in the point cloud based on the instance-fused semantic feature is realized by using the independent fully connected layer of each point. The computer device inputs the semantic embedding vector of the entire point cloud, that is, the instance-fused semantic feature vector of each point, into the independent third fully connected layer of each point, and processes the semantic embedding vector of the entire point cloud by using the third fully connected layer, to output a semantic prediction matrix of the point cloud. The semantic prediction matrix of the point cloud includes a semantic prediction vector of each point. The number of dimensions of the semantic prediction vector of each point is the quantity of preset semantic categories. Accordingly, a semantic category corresponding to a maximum vector element in the semantic prediction vector of each point may be used as the semantic category to which each point belongs.

It may be understood that each vector element in the semantic prediction vector may correspond to a probability of a semantic category. For example, it is assumed that a semantic prediction vector of a point is $X_{SEM}=(0.1,0.1,0.6, 0.1,0.1)$, where a third vector element is the largest; then a semantic category corresponding to the third vector element is the semantic category to which the point belongs.

In one embodiment, a network structure of the independent third fully connected layer of each point includes a normalization layer and an activation layer, and the two network layers sequentially process inputted data.

Still referring to FIG. 4, after obtaining the semantic embedding vector $F_{ISEM}$ of the point cloud, that is, the instance-fused semantic feature vector of each point in the point cloud, the computer device outputs a semantic prediction matrix $P_{SEM}$ of the point cloud, that is, a set of the semantic prediction vectors of the points by using the independent fully connected layer of each point.

Still referring to FIG. 3, after the semantic feature matrix $F_{SEM}$ and the instance feature matrix $F_{INS}$ are inputted to the network structure of associatively segmenting instances and semantics, another output is obtained: a semantic prediction matrix $P_{SEM}$. The quantity of semantic categories preset by the computer device is $N_C$; in this case, a size of the semantic prediction matrix $P_{SEM}$ is $N_P \times N_C$. The computer device may perform an Argmax (the arguments of the maxima) operation on $P_{SEM}$ to determine the semantic category to which each point belongs.

In this embodiment of this application, after the instance-fused semantic feature of the entire point cloud is obtained, semantic segmentation may be performed on each point by using the fully connected layer, so that the segmentation result is more accurate.

In one embodiment, step S510 is further included:

S510. Determine an instance category to which each point belongs according to the semantic-fused instance feature of each point and a semantic category to which each point belongs.

In one embodiment, the determining an instance category to which each point belongs according to the semantic-fused instance feature of each point and a semantic category to which each point belongs includes: separately calculating feature distances between the instance feature of each point in the point cloud and instance features of other points in the point cloud except each point; clustering all points in the point cloud according to the feature distances obtained through calculation, to obtain a plurality of sets of points; and determining an instance category to which each set of points belongs according to a semantic category to which each set of points in the plurality of sets of points belongs, that is, determining an instance category to which points included in each set of points belong according to a semantic category to which points included in each set of points belong. S510 is included in S210.

It may be understood that when the semantic segmentation result has not been obtained, the instance segmentation of the point cloud is an instance segmentation result at the abstract level, that is, it can only be determined which points belong to the same instance. After the semantic segmentation result is obtained, an instance segmentation result at the specific level may be obtained with reference to the semantic segmentation result.

Still referring to FIG. 3, after obtaining the semantic segmentation result of each point in the point cloud, the computer device may obtain the instance segmentation result at the specific level by combining the instance segmentation result at the abstract level with the semantic segmentation result of each point, and determine which points belong to which instance.

For example, after determining which points belong to the same instance, the computer device may determine a specific instance category of the instance with reference to the semantic segmentation result of the points in the instance. For example, there are 10 points in a point cloud. It is obtained through clustering that 3 points belong to a first instance, another 3 points belong to a second instance, and the remaining 4 points belong to a third instance. In this case, if a semantic segmentation result of the 3 points in the first instance is a cat, the first instance is a first cat, and an instance category of the points in this instance is the first cat. If a semantic segmentation result of the 3 points in the second instance is a cat, the second instance is a second cat, and an instance category of the points in this instance is the second cat. If a semantic segmentation result of the 4 points in the third instance is a cat, the third instance is a third cat, and an instance category of the points in this instance is the third cat. This is the instance segmentation result at the specific level.

In this embodiment of this application, after the instance segmentation result at the abstract level is obtained, the instance segmentation result at the specific level may be obtained with reference to the semantic segmentation result. The semantic segmentation benefits from the instance segmentation, and the instance segmentation also benefits from the semantic segmentation. Accordingly, the accuracy of point cloud segmentation is greatly improved.

Figure 6:
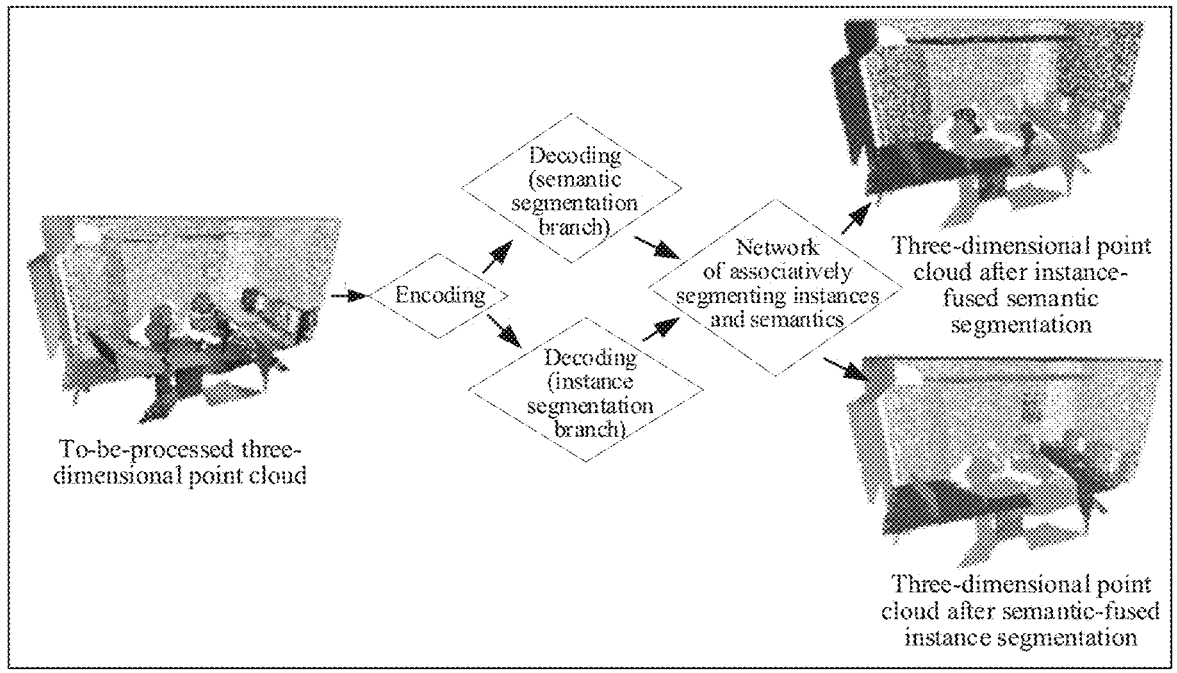
FIG. 6 is a schematic diagram of associatively segmenting instances and semantics in a point cloud in an embodiment.

FIG. 6 is a schematic diagram of associatively segmenting instances and semantics in a point cloud in an embodiment. Referring to FIG. 6, a to-be-processed three-dimensional point cloud is encoded to obtain a shared feature, the shared feature is decoded by a semantic segmentation branch (Sem.Decoder) to obtain a semantic feature and decoded by an instance segmentation branch (Ins.Decoder) to obtain an instance feature in parallel, and the semantic feature and the instance feature undergo ASIS to obtain a three-dimensional point cloud after semantic-fused instance segmentation and a three-dimensional point cloud after instance-fused semantic segmentation.

In the foregoing embodiment, the to-be-processed point cloud is encoded to obtain the shared feature, and the shared feature is decoded according to different decoding branches, to obtain a semantic feature and an instance feature respectively. According to one respect, the semantic feature is adapted to an instance feature space and fused with the instance feature, to obtain an instance feature with rich semantic awareness of the point cloud, thereby obtaining an instance feature with rich semantic awareness of each point in the point cloud. According to another respect, points in the point cloud are grouped by instances according to the instance feature with rich semantic awareness of each point, and semantic features of points belonging to the same instance are fused, so that the semantic segmentation benefits from the instance segmentation. Accordingly, the instance features with rich semantic awareness are learned, so that the instance segmentation benefits from the semantic segmentation. Meanwhile, semantic features of points belonging to the same instance are fused to produce semantic category predictions with higher accuracy. The two types of segmentation benefit from each other, to achieve a win-win performance improvement. Not only the efficiency of segmentation is improved, but also the accuracy of segmentation is improved.

In one embodiment, alternatively, the point cloud segmentation method may merely include steps S202-S208 or S502-S508, that is, the steps of performing semantic-fused instance segmentation or instance-fused semantic segmentation on the point cloud.

In one embodiment, the point cloud segmentation method provided in this embodiment of this application may alternatively include: encoding a to-be-processed point cloud to obtain a shared feature; decoding the shared feature according to different decoding methods, to obtain a semantic feature of the point cloud and an instance feature of the point cloud respectively; adapting the semantic feature of the point cloud to an instance feature space and fusing the semantic feature with the instance feature of the point cloud, to obtain a semantic-fused instance feature of the point cloud; dividing the semantic-fused instance feature of the point cloud, to obtain a semantic-fused instance feature of each point in the point cloud; determining a plurality of adjacent points corresponding to each point according to the semantic-fused instance feature of each point; fusing semantic features of the plurality of adjacent points corresponding to each point, to obtain an instance-fused semantic feature of the corresponding point; determining a semantic category to which each point belongs according to the instance-fused semantic feature of each point; and determining an instance category to which each point belongs according to the semantic-fused instance feature of each point and the semantic category to which each point belongs. That is, steps of associative semantic-fused instance segmentation and instance-fused semantic segmentation are performed on the point cloud.

In one embodiment, in the foregoing embodiment, after the to-be-processed point cloud is obtained, a deep learning network structure used in the process of processing the point cloud until obtaining the instance segmentation result and the semantic segmentation result may be uniformly obtained through training. The training process is a supervised training process. Point cloud samples are used as training data, and the computer device may determine an instance category label and a semantic category label for each point sample in each point cloud sample for supervised training.

In summary, the technical solutions provided in the embodiments of this application have broad application prospects, and have great potential in the fields of automatic driving, indoor navigation, and augmented reality. In addition, with the development and popularization of three-dimensional sensors, the perception of a three-dimensional space becomes particularly important. For example, in the control of an indoor robot, if a scanned three-dimensional point cloud can be segmented, for example, segmented by semantics and instances, the robot can accurately perceive each type of object (semantic segmentation) or even each object (instance segmentation), to further empower the navigation and control of the robot.

The semantic segmentation may be used for guiding the control of the indoor robot: for example, in an indoor scene, the robot obtains a point cloud in front through a sensor. According to the technical solutions provided in this application, the robot can learn that a door is in front and learn which part is a door handle, so as to perform further operations such as opening the door.

For the instance segmentation, an elementary application is quantitative statistics, such as counting chairs in a room, or guiding the control of a robot, such as learning the position of each chair. Alternatively, in an augmented reality scene, each chair may be converted into a little monster.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this application, execution of the steps is not strictly limited, and the steps may be performed in other sequences. In addition, at least some of the steps in the foregoing embodiments may include a plurality of sub-steps or a plurality of stages. These sub-steps or stages are not necessarily completed at the same moment, but may be performed at different moments. Besides, these sub-steps or stages may not be necessarily performed sequentially, but may be performed in turn or alternately with other steps or at least some of sub-steps or stages of other steps.

Figure 7:
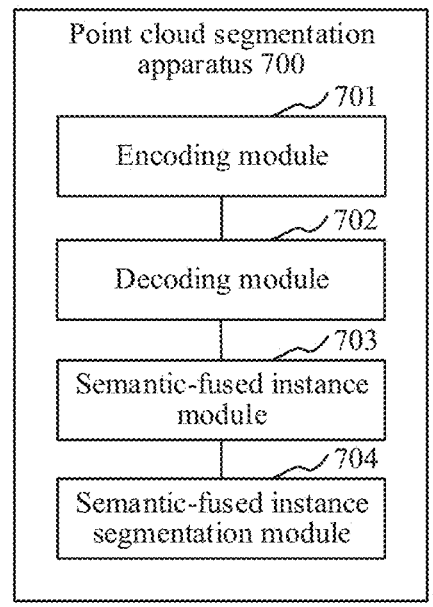
FIG. 7 is a structural block diagram of a point cloud segmentation apparatus in an embodiment.

As shown in FIG. 7, in one embodiment, a point cloud segmentation apparatus 700 is provided. Referring to FIG. 7, the point cloud segmentation apparatus 700 includes: an encoding module 701, a decoding module 702, a semantic-fused instance module 703, and a semantic-fused instance segmentation module 704.

The encoding module 701 is configured to encode a to-be-processed point cloud to obtain a shared feature.

The decoding module 702 is configured to decode the shared feature according to different decoding methods, to obtain a semantic feature and an instance feature respectively.

The semantic-fused instance module 703 is configured to adapt the semantic feature to an instance feature space and fuse the semantic feature with the instance feature, to obtain a semantic-fused instance feature of the point cloud, the semantic-fused instance feature of the point cloud representing an instance feature fused with the semantic feature; and divide the semantic-fused instance feature of the point cloud, to obtain a semantic-fused instance feature of each point in the point cloud.

The semantic-fused instance segmentation module 704 is configured to determine an instance category to which each point belongs according to the semantic-fused instance feature of each point.

According to the foregoing point cloud segmentation apparatus 700, the to-be-processed point cloud is first encoded to obtain the shared feature; then the shared feature is decoded by using different decoding branches, to obtain the semantic feature and the instance feature respectively; the semantic feature is adapted to the instance feature space and fused with the instance feature, to obtain the instance feature with rich semantic awareness of the point cloud; then the instance feature with rich semantic awareness of each point in the point cloud is obtained, thereby determining the instance category to which each point belongs. Accordingly, segmentation no longer relies on a feature-based similarity matrix, thereby improving efficiency of point cloud segmentation. In addition, the instance feature with rich semantic awareness is learned, so that instance segmentation can benefit from semantic segmentation, thereby greatly improving accuracy of point cloud segmentation.

In one embodiment, the encoding module 701 is further configured to obtain the to-be-processed point cloud; combine a coordinate feature and a channel feature of each point in the point cloud, to obtain an initial feature of the corresponding point; and jointly encode the initial features of the points, to obtain the shared feature corresponding to the point cloud.

In one embodiment, the decoding module 702 is further configured to decode the shared feature by using a first decoding structure to obtain the semantic feature; and decode the shared feature by using a second decoding structure to obtain the instance feature, where the first decoding structure and the second decoding structure include a same structure and different decoding parameters.

In one embodiment, the semantic feature is a semantic feature matrix, and the instance feature is an instance feature matrix. The semantic-fused instance module 703 is further configured to adapt the semantic feature matrix to the instance feature space by using an independent first fully connected layer of each point; and perform element-wise addition on the semantic feature matrix adapted to the instance feature space and the instance feature matrix, to obtain a first matrix of the point cloud, the first matrix being a semantic-fused instance feature matrix.

In one embodiment, the semantic-fused instance module 703 is further configured to input the semantic-fused instance feature matrix of the point cloud into an independent second fully connected layer of each point; and sequentially process the first matrix of the point cloud by using a normalization layer and an activation layer included in the second fully connected layer, to obtain a first vector of each point in the point cloud, the first vector being a semantic-fused instance feature vector.

In one embodiment, the semantic-fused instance segmentation module 704 is further configured to separately calculate feature distances between the semantic-fused instance feature of each point in the point cloud and semantic-fused instance features of other points in the point cloud except each point; and cluster points in the point cloud according to the feature distances obtained through calculation, to obtain a plurality of sets of points, each set of points in the plurality of sets of points being corresponding to an instance category.

Figure 8:
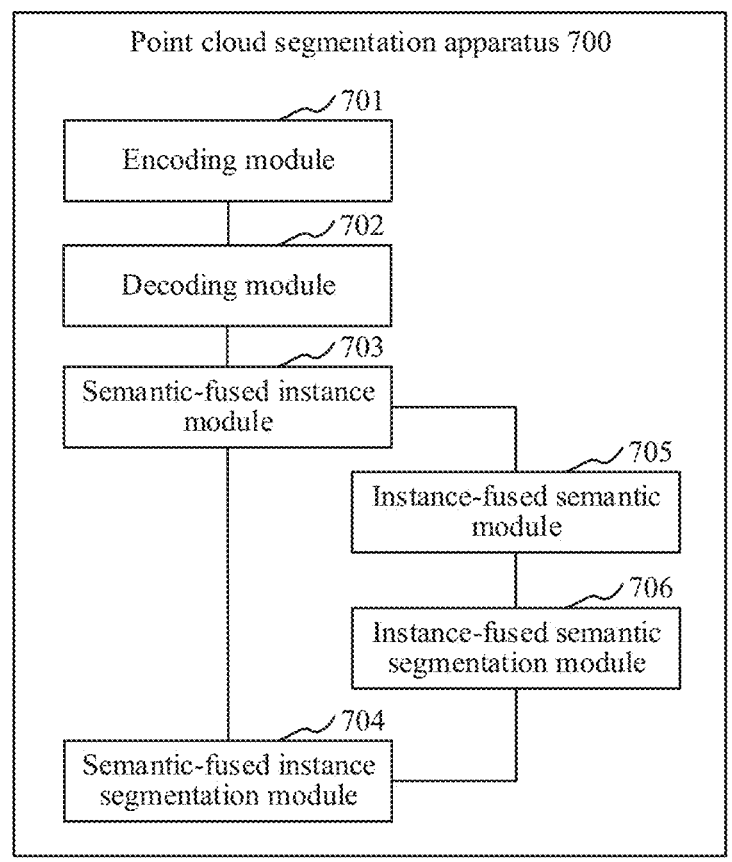
FIG. 8 is a structural block diagram of a point cloud segmentation apparatus in another embodiment.

As shown in FIG. 8, in one embodiment, the point cloud segmentation apparatus 700 further includes: an instance-fused semantic module 705 and an instance-fused semantic segmentation module 706.

The instance-fused semantic module 705 is configured to separately use each point in the point cloud as a central point; determine a plurality of adjacent points corresponding to each central point according to the semantic-fused instance feature of each point; and fuse semantic features of the plurality of adjacent points corresponding to each central point, to obtain an instance-fused semantic feature of the corresponding central point.

The instance-fused semantic segmentation module 706 is configured to determine a semantic category to which each point belongs according to the instance-fused semantic feature of each central point.

According to the foregoing point cloud segmentation apparatus 700, the to-be-processed point cloud is first encoded to obtain the shared feature; then the shared feature is decoded by using different decoding branches, to obtain the semantic feature and the instance feature respectively. According to one respect, the semantic feature is adapted to an instance feature space and fused with the instance feature, to obtain an instance feature with rich semantic awareness of the point cloud, and to further obtain an instance feature with rich semantic awareness of each point in the point cloud. According to another respect, points in the point cloud are grouped by instances according to the instance feature with rich semantic awareness of each point, and semantic features of points belonging to the same instance are fused, so that the semantic segmentation benefits from the instance segmentation. Accordingly, the instance features with rich semantic awareness are learned, so that the instance segmentation benefits from the semantic segmentation. Meanwhile, semantic features of points belonging to the same instance are fused to produce semantic category predictions with higher accuracy. The two types of segmentation benefit from each other, to achieve a win-win performance improvement. Not only the efficiency of segmentation is improved, but also the accuracy of segmentation is improved.

In one embodiment, the instance-fused semantic module 705 is further configured to separately calculate a feature distance between each central point and each point in the point cloud according to In one embodiment, the decoding module 702 is further configured to decode the shared feature in a first decoding method to obtain a semantic feature matrix of the point cloud; and decode the shared feature in a second decoding method different from the first decoding method to obtain an instance feature matrix of the point cloud, the semantic feature matrix including a semantic feature vector of each point in the point cloud. The instance-fused semantic module 705 is further configured to perform element-wise aggregation on semantic feature vectors of the plurality of adjacent points corresponding to each central point, to obtain a second vector of the corresponding central point, the second vector being an instance-fused semantic feature vector.

In 3222e211 one embodiment, the instance-fused semantic segmentation module 706 is further configured to convert the instance-fused semantic feature of each central point into a corresponding semantic prediction vector by using an independent third fully connected layer of each point; and use a semantic category corresponding to a maximum vector element in the semantic prediction vector of each central point as the semantic category to which each point belongs.

In one embodiment, the semantic-fused instance segmentation module 704 is further configured to separately calculate feature distances between the instance feature of each point in the point cloud and instance features of other points in the point cloud except each point; cluster points in the point cloud according to the feature distances obtained through calculation, to obtain a plurality of sets of points; and determine an instance category to which each set of points belongs according to a semantic category to which each set of points in the plurality of sets of points belongs.

Figure 9:
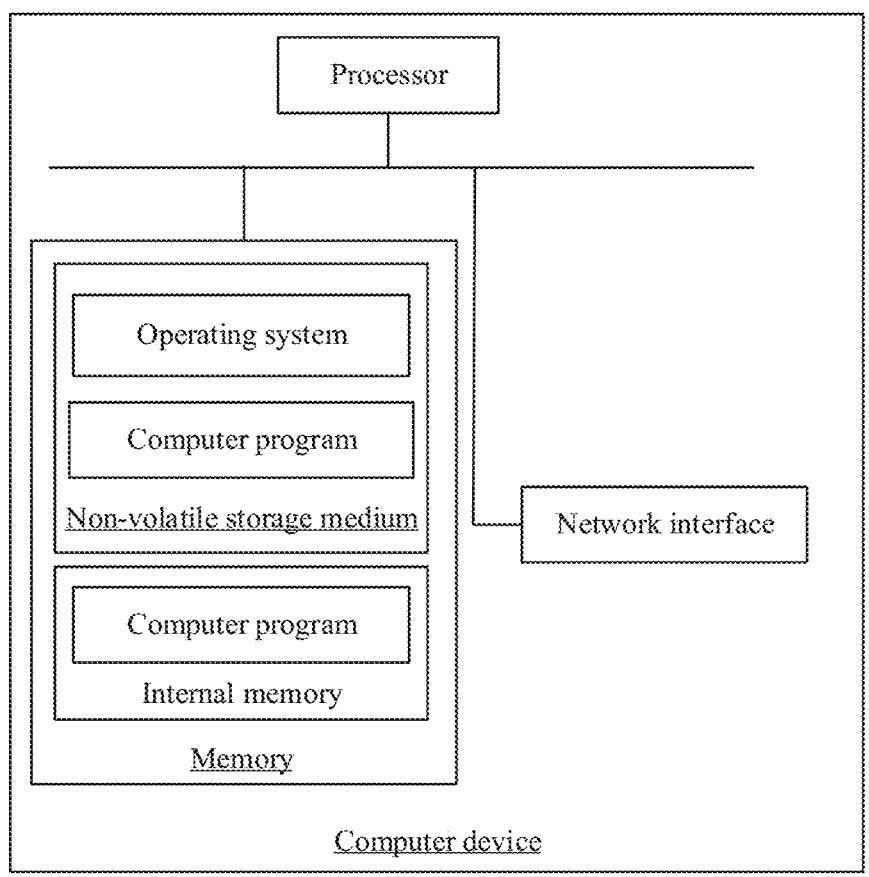
FIG. 9 is a structural block diagram of a computer device in an embodiment.

FIG. 9 is a diagram of an internal structure of a computer device in one embodiment. The computer device may be the terminal 110 or the server 120 in FIG. 1. As shown in FIG. 9, the computer device includes a processor, a memory, and a network interface connected by using a system bus. The memory includes a non-volatile storage medium and an internal memory. The non-volatile storage medium of the computer device stores an operating system and may further store a computer program. The computer program, when executed by the processor, may cause the processor to implement the point cloud segmentation method. The internal memory may also store a computer program. The computer program, when executed by the processor, may cause the processor to perform the point cloud segmentation method. A person skilled in the art may understand that, the structure shown in FIG. 9 is only a block diagram of a part of a structure related to a solution of this application and does not limit the computer device to which the solution of this application is applied. Specifically, the computer device may include more or fewer members than those in the drawings, or include a combination of some members, or include different member layouts.

In one embodiment, the point cloud segmentation apparatus provided in this application may be implemented in the form of a computer program, and the computer program may be run on the computer device shown in FIG. 9. The memory of the computer device may store various program modules that form the point cloud segmentation apparatus, for example, the encoding module 701, the decoding module 702, the semantic-fused instance module 703, and the semantic-fused instance segmentation module 704 that are shown in FIG. 7. The computer program formed by the program modules causes the processor to perform the steps of the point cloud segmentation method in the embodiments of this application that are described in this specification.

For example, the computer device shown in FIG. 9 may encode the to-be-processed point cloud to obtain the shared feature through the encoding module 701 in the point cloud segmentation apparatus 700 shown in FIG. 7. The decoding module 702 is configured to decode the shared feature according to different decoding methods, to obtain a semantic feature and an instance feature respectively. The semantic-fused instance module 703 is configured to adapt the semantic feature to an instance feature space and fuse the semantic feature with the instance feature, to obtain a semantic-fused instance feature of the point cloud, the semantic-fused instance feature of the point cloud representing an instance feature fused with the semantic feature; and divide the semantic-fused instance feature of the point cloud, to obtain a semantic-fused instance feature of each point in the point cloud. The semantic-fused instance segmentation module 704 is configured to determine an instance category to which each point belongs according to the semantic-fused instance feature of each point.

In one embodiment, a computer device is provided, including a processor and a memory, the memory storing a computer program, the computer program, when executed by the processor, causing the processor to perform steps of the foregoing point cloud segmentation method. Herein, the steps of the point cloud segmentation method may be the steps of the point cloud segmentation method in the foregoing embodiments.

In one embodiment, a computer-readable storage medium is provided, storing a computer program, the computer program, when executed by a processor, causing the processor to perform steps of the foregoing point cloud segmentation method. Herein, the steps of the point cloud segmentation method may be the steps of the point cloud segmentation method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other media used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists.

The foregoing embodiments show only several implementations of this application and are described in detail, which, however, are not to be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A point cloud segmentation method, comprising:
encoding a to-be-processed point cloud to obtain a shared feature, the shared feature referring to a feature shared at a semantic level and at an instance level;
decoding the shared feature to obtain a semantic feature and an instance feature respectively;
adapting the semantic feature to an instance feature space and fusing the semantic feature with the instance feature, to obtain a semantic-fused instance feature of the point cloud, the semantic-fused instance feature representing an instance feature fused with the semantic feature;
dividing the semantic-fused instance feature of the point cloud by using an independent fully-connected layer of each point in the point cloud to process the semantic-fused instance feature of the point cloud, to obtain a semantic-fused instance feature of each point in the point cloud; and determining an instance category to which each point belongs according to the semantic-fused instance feature of each point, wherein the semantic feature is a semantic feature matrix, the instance feature is an instance feature matrix, and the adapting the semantic feature to an instance feature space and fusing the semantic feature with the instance feature, to obtain a semantic-fused instance feature of the point cloud comprises:

adapting the semantic feature matrix to the instance feature space by using an independent first fully connected layer of each point; and performing element-wise addition on the semantic feature matrix adapted to the instance feature space and the instance feature matrix, to obtain a first matrix of the point cloud, the first matrix being a semantic-fused instance feature matrix.

2. The method according to claim 1, wherein the encoding a to-be-processed point cloud to obtain a shared feature comprises:

obtaining the to-be-processed point cloud;

combining a coordinate feature and a channel feature of each point in the point cloud, to obtain an initial feature of the corresponding point; and jointly encoding the initial features of the points, to obtain the shared feature corresponding to the point cloud.

3. The method according to claim 1, wherein the decoding the shared feature to obtain a semantic feature and an instance feature respectively comprises:

decoding the shared feature by using a first decoding structure to obtain the semantic feature; and decoding the shared feature by using a second decoding structure to obtain the instance feature, the first decoding structure and the second decoding structure having a same structure and different decoding parameters.

4. The method according to claim 1, wherein the dividing the semantic-fused instance feature of the point cloud, to obtain a semantic-fused instance feature of each point in the point cloud comprises:

inputting the semantic-fused instance feature matrix of the point cloud into an independent second fully connected layer of each point; and sequentially processing the first matrix of the point cloud by using a normalization layer and an activation layer comprised in the second fully connected layer, to obtain a first vector of each point in the point cloud, the first vector being a semantic-fused instance feature vector.

5. The method according to claim 1, wherein the determining an instance category to which each point in the point cloud belongs according to the instance feature of each point in the point cloud comprises:

separately calculating feature distances between the semantic-fused instance feature of each point in the point cloud and semantic-fused instance features of other points in the point cloud; and clustering points in the point cloud according to the feature distances obtained through calculation, to obtain a plurality of sets of points, each set of points in the plurality of sets of points being corresponding to an instance category.

6. The method according to claim 1, further comprising: separately using each point in the point cloud as a central point;

determining a plurality of adjacent points corresponding to each central point according to the semantic-fused instance feature of each point;

fusing semantic features of the plurality of adjacent points corresponding to each central point, to obtain an instance-fused semantic feature of the corresponding central point; and determining a semantic category to which each point belongs according to the instance-fused semantic feature of each central point.

7. The method according to claim 6, wherein the determining a plurality of adjacent points corresponding to each central point according to the semantic-fused instance feature of each point comprises:

separately calculating a feature distance between each central point and each point in the point cloud according to the semantic-fused instance feature of each point; and selecting a plurality of points whose feature distances from the central point are less than a distance as the plurality of adjacent points corresponding to the central point.

8. The method according to claim 7, wherein the decoding the shared feature to obtain a semantic feature and an instance feature respectively comprises:

decoding the shared feature in a first decoding method to obtain a semantic feature matrix of the point cloud; and decoding the shared feature in a second decoding method different from the first decoding method to obtain an instance feature matrix of the point cloud, the semantic feature matrix comprising a semantic feature vector of each point in the point cloud; and the fusing semantic features of the plurality of adjacent points corresponding to each central point, to obtain an instance-fused semantic feature of the corresponding central point comprises:

performing element-wise aggregation on semantic feature vectors of the plurality of adjacent points corresponding to each central point, to obtain a second vector of the corresponding central point, the second vector being an instance-fused semantic feature vector.

9. The method according to claim 6, wherein the determining a semantic category to which each point belongs according to the instance-fused semantic feature of each central point comprises:

converting the instance-fused semantic feature of each central point into a corresponding semantic prediction vector by using an independent third fully connected layer of each point; and using a semantic category corresponding to a maximum vector element in the semantic prediction vector of each central point as the semantic category to which each point belongs.

10. The method according to claim 9, wherein the determining an instance category to which each point belongs according to the semantic-fused instance feature of each central point comprises:

separately calculating feature distances between the instance feature of each point in the point cloud and instance features of other points in the point cloud;

clustering points in the point cloud according to the feature distances obtained through calculation, to obtain a plurality of sets of points; and determining an instance category to which each set of points belongs according to a semantic category to which each set of points in the plurality of sets of points belongs.

11. A non-transitory computer-readable storage medium, storing a computer program, the computer program, when executed by at least one processor, causing the at least one processor to perform operations comprising:
- encoding a to-be-processed point cloud to obtain a shared feature, the shared feature referring to a feature shared at a semantic level and at an instance level;
- decoding the shared feature to obtain a semantic feature and an instance feature respectively;
- adapting the semantic feature to an instance feature space and fusing the semantic feature with the instance feature, to obtain a semantic-fused instance feature of the point cloud, the semantic-fused instance feature representing an instance feature fused with the semantic feature;
- dividing the semantic-fused instance feature of the point cloud by using an independent fully-connected layer of each point in the point cloud to process the semantic-fused instance feature of the point cloud, to obtain a semantic-fused instance feature of each point in the point cloud; and
- determining an instance category to which each point belongs according to the semantic-fused instance feature of each point,
- wherein the semantic feature is a semantic feature matrix, the instance feature is an instance feature matrix, and the adapting the semantic feature to an instance feature space and fusing the semantic feature with the instance feature, to obtain a semantic-fused instance feature of the point cloud comprises:
- adapting the semantic feature matrix to the instance feature space by using an independent first fully connected layer of each point; and
- performing element-wise addition on the semantic feature matrix adapted to the instance feature space and the instance feature matrix, to obtain a first matrix of the point cloud, the first matrix being a semantic-fused instance feature matrix.

12. A computer device, comprising a memory and at least one processor, the memory storing a computer program, the computer program, when executed by the at least one processor, causing the at least one processor to perform operations comprising:
- encoding a to-be-processed point cloud to obtain a shared feature, the shared feature referring to a feature shared at a semantic level and at an instance level;
- decoding the shared feature to obtain a semantic feature and an instance feature respectively;
- adapting the semantic feature to an instance feature space and fusing the semantic feature with the instance feature, to obtain a semantic-fused instance feature of the point cloud, the semantic-fused instance feature representing an instance feature fused with the semantic feature;
- dividing the semantic-fused instance feature of the point cloud by using an independent fully-connected layer of each point in the point cloud to process the semantic-fused instance feature of the point cloud, to obtain a semantic-fused instance feature of each point in the point cloud; and
- determining an instance category to which each point belongs according to the semantic-fused instance feature of each point,
- wherein the semantic feature is a semantic feature matrix, the instance feature is an instance feature matrix, and the adapting the semantic feature to an instance feature space and fusing the semantic feature with the instance feature, to obtain a semantic-fused instance feature of the point cloud comprises:
- adapting the semantic feature matrix to the instance feature space by using an independent first fully connected layer of each point; and
- performing element-wise addition on the semantic feature matrix adapted to the instance feature space and the instance feature matrix, to obtain a first matrix of the point cloud, the first matrix being a semantic-fused instance feature matrix.

13. The device according to claim 12, wherein the at least one processor is further configured to perform:
- obtaining the point cloud;
- combining a coordinate feature and a channel feature of each point in the point cloud, to obtain an initial feature of the corresponding point; and
- jointly encoding the initial features of the points, to obtain the shared feature corresponding to the point cloud.

14. The device according to claim 12, wherein the at least one processor is further configured to perform:
- decoding the shared feature by using a first decoding structure to obtain the semantic feature; and
- decoding the shared feature by using a second decoding structure to obtain the instance feature, wherein
- the first decoding structure and the second decoding structure comprise a same structure and different decoding parameters.

15. The device according to claim 12, wherein the at least one processor is further configured to perform:
- inputting the semantic-fused instance feature matrix of the point cloud into an independent second fully connected layer of each point; and
- sequentially processing the first matrix of the point cloud by using a normalization layer and an activation layer comprised in the second fully connected layer, to obtain a first vector of each point in the point cloud, the first vector being a semantic-fused instance feature vector.

16. The device according to claim 12, wherein the at least one processor is further configured to perform:
- separately calculating feature distances between the semantic-fused instance feature of each point in the point cloud and semantic-fused instance features of other points in the point cloud; and
- clustering points in the point cloud according to the feature distances obtained through calculation, to obtain a plurality of sets of points, each set of points in the plurality of sets of points being corresponding to an instance category.

17. The device according to claim 12, wherein the at least one processor is further configured to perform:
- separately using each point in the point cloud as a central point;
- determining a plurality of adjacent points corresponding to each central point according to the semantic-fused instance feature of each point;
- fusing semantic features of the plurality of adjacent points corresponding to each central point, to obtain an instance-fused semantic feature of the corresponding central point; and
- determining a semantic category to which each point belongs according to the instance-fused semantic feature of each central point.

18. The device according to claim 17, wherein the at least one processor is further configured to perform:

separately calculating a feature distance between each central point and each point in the point cloud according to the semantic-fused instance feature of each point; and selecting a plurality of points whose feature distances from the central point are less than a distance as the plurality of adjacent points corresponding to the central point.

* * * * *